(12) United States Patent
Moll et al.

(10) Patent No.: US 9,396,163 B2
(45) Date of Patent: Jul. 19, 2016

(54) MIXING OPTIMAL SOLUTIONS

(71) Applicant: International Business Machines Corporation, Armonk, NY (US)

(72) Inventors: Georges-Henri Moll, Villeneuve-Loubet (FR); Xavier Nodet, Antibes (FR)

(73) Assignee: International Business Machines Corporation, Armonk, NY (US)

( * ) Notice: Subject to any disclaimer, the term of this patent is extended or adjusted under 35 U.S.C. 154(b) by 174 days.

(21) Appl. No.: 14/343,956

(22) PCT Filed: Dec. 5, 2012

(86) PCT No.: PCT/IB2012/056971
§ 371 (c)(1),
(2) Date: Mar. 10, 2014

(87) PCT Pub. No.: WO2013/093683
PCT Pub. Date: Jun. 27, 2013

(65) Prior Publication Data
US 2015/0286611 A1    Oct. 8, 2015

(30) Foreign Application Priority Data

Dec. 22, 2011 (EP) .................................... 11290592

(51) Int. Cl.
*G06F 1/02* (2006.01)
*G06F 7/38* (2006.01)
(Continued)

(52) U.S. Cl.
CPC .............. *G06F 17/12* (2013.01); *G06F 17/11* (2013.01); *G06F 17/13* (2013.01); *G06Q 10/04* (2013.01)

(58) Field of Classification Search
CPC ....................................................... G06F 17/16
USPC .................................................. 708/102, 446
See application file for complete search history.

(56) References Cited

U.S. PATENT DOCUMENTS

| 7,346,528 B2 | 3/2008 | Thengvall et al. |
| 2002/0156663 A1 | 10/2002 | Weber et al. |

(Continued)

FOREIGN PATENT DOCUMENTS

| CN | 101409447 A | 4/2009 |
| CN | 101813917 A | 8/2010 |

OTHER PUBLICATIONS

Streiffert et al., "A Mixed Integer Programming Solution for Market Clearing and Reliability Analysis", 0-7803-9156-X, 2005, IEEE, pp. 1-8.

(Continued)

*Primary Examiner* — Tan V. Mai
(74) *Attorney, Agent, or Firm* — Daniel R. Simek; Peter J. Edwards

(57) ABSTRACT

This invention relates to a method, system and computer program product for selecting an optimized solution in a computerised multiple-constraint problem space, comprising: receiving a linear function for optimization; receiving a set of constraints for the linear function; determining a first optimal solution for the linear function and initial constraints using linear programming solver; creating a new set of constrains using the first optimal solution as a constraint in addition to the initial constraints; creating a new quadratic function by adding a quadratic objective of slack variables to the linear function; and determining a solution to the quadratic function and new constraints using a quadratic programming solver.

13 Claims, 20 Drawing Sheets

(51) Int. Cl.
*G06F 17/12* (2006.01)
*G06Q 10/04* (2012.01)
*G06F 17/11* (2006.01)
*G06F 17/13* (2006.01)

(56) References Cited

U.S. PATENT DOCUMENTS

| | | |
|---|---|---|
| 2005/0265359 A1 | 12/2005 | Drew et al. |
| 2009/0182814 A1* | 7/2009 | Tapolcai ............... H04L 67/104 709/205 |
| 2009/0271230 A1 | 10/2009 | Huang et al. |
| 2009/0271241 A1* | 10/2009 | Pratt .................... G06Q 10/063 705/7.11 |
| 2010/0287073 A1 | 11/2010 | Kocis et al. |
| 2011/0131167 A1 | 6/2011 | Achterberg |
| 2011/0202638 A1 | 8/2011 | Venugopal et al. |

OTHER PUBLICATIONS

International Application No. PCT/IB2012/056971, Search Report and Written Opinion, dated Apr. 25, 2013, 10 pages.
International Application No. PCT/IB2012/056971, Extended European Search Report, dated Jul. 5, 2015, 5 pages.
Unknown, "Linear programming," From Wikipedia, the free encyclopedia, last modified on Dec. 2, 2015 at 06:34, last printed on Dec. 11, 2015 at 9:18AM, 23 pages.
Unknown, "General equilibrium theory," From Wikipedia, the free encyclopedia, last modified on Dec. 2, 2015 at 15:31, last printed on Dec. 11, 2015 at 9:16AM, 15 pages.

* cited by examiner

```
1  read mps matrix M
2  //matrix plus bounds plus objective plus RHS
3  solve the MIP problem using MIP-solver //CPLEX
```

FIGURE 4A

```
4  double O1= optimal value;
```

FIGURE 4B

```
4  double O1= optimal value;
5  get objective Obj from M;
6  get epsilon fromparameters;
7  add constraints O1-epsilon<=Obj<=O1+epsilon;
```

FIGURE 4C

```
 8  //add slack variables for inequalities
 9  S = empty set; //S is the set of slack variables
10  for each inequality Ei in M, i=1 to n
11      add slack variable Yi>=0 to matrix M;
12      add Yi to set S;
13      int coef = 0;
14      if inequality is <=
15          coeficient = +1 ;
16      if inequality is >=
17          coeficient = -1 ;
18      add coeficient -1 for variable Yi, inequality Ei
19      set constraint Ei to be equality;
20  //add slack variables for lower bounds
21  OriginalLower = empty set;
22  for each lower bounded variable Xi in M, i=1 to m, bounded with LBi
23      if LBi == 0
24          add Xi to set S;
25          //keep track of slack variables which are originally
    decision variables
26          add Xi to OriginalLower;
27      else
28          create new variable Zi>=0;
29          add Zi to set S
30          create new constraint Zi=Xi-LBi;
31  //add slack variables for upper bounds
32  for each upper bounded variable Xi in M, i=1 to k, bounded with UBi
33          create new variable Ti>=0;
34          add Ti to set S;
35          create new constraint Yi=UPi-Xi;
36  //input slack variable coeficients from user
37  for each Vi in S i=1 to n+m+k;
38      get Ci normalization coeficient;
```

FIGURE 4D

```
39    //create quadratic objective
40    create (empty) quadratic objective Q
41    for each Vi in S i=1 to n+m+k;
42        add (Ci*Vi)^2 to Q;
43    //solve quadratic problem
44    minimize Q, undwer constraints in M; //using QP-solver
```

FIGURE 4E

```
45    //output the solution
46    for each decision variable H in (M - S) +OriginalLower
47    //decision variables of the original problem (variables not in S
      except variables in OriginalLower)
48        get value v of H from QP-Solver; //CPLEX
49        output value v;
50    //end
```

FIGURE 4F

Example Constraints

| Production Rate (PR): number of cars per day by factory ||
|---|---|
| Production Rate (PR) | Factory |
| PR1=10 | 1 |
| PR2=3 | 2 |
| PR3=10 | 3 |

FIGURE 5

Example Constraints

| Resource Availability (RA): number of days each factory is available in a particular week | | | | |
|---|---|---|---|---|
| | Week | | | Factory |
| | 1 | 2 | 3 | |
| Resource Availability (RA) | 5 | 2 | 4 | 1 |
| | 7 | 1 | 3 | 2 |
| | 6 | 5 | 7 | 3 |

FIGURE 6

Example Constraints

| Demand (DM): Number of cars required in a particular week. | | | |
|---|---|---|---|
| | Week | | |
| | 1 | 2 | 3 |
| Demand (DM) | DM1=10 | DM2=10 | DM3=150 |

FIGURE 7

Example Legend

Example: Pre-Solution Stage

| Production Days (PD): number of days that a factory can produce in a given week | | | | |
|---|---|---|---|---|
| | Week | | | Factory |
| | 1 | 2 | 3 | |
| Production Days (PD) [decision variable] | PD11 | PD21 | PD31 | 1 |
| | PD12 | PD22 | PD32 | 2 |
| | PD13 | PD23 | PD33 | 3 |
| Total Production Days ($\sum$PD) in all factories | $\sum$PD1x | $\sum$PD2x | $\sum$PD3x | |

| Unused Days (UD): number of days a factory is not used in a given week= Resource Availability (RA) - Production Days (PD) | | | | |
|---|---|---|---|---|
| | Week | | | Factory |
| | 1 | 2 | 3 | |
| Unused Days (UD) [non-negativity constraint] | RA11-PD11 | RA21-PD21 | RA31-PD31 | 1 |
| | RA12-PD12 | RA22-PD22 | RA32-PD32 | 2 |
| | RA13-PD13 | RA23-PD23 | RA33-PD33 | 3 |

| Sum of squares of unused days (objective) |
|---|
| =UD11^2+UD12^2+UD13^2+UD21^2+UD22^2+UD23^3+UD31^2+UD32^2+UD33^2 |

FIGURE 9A

Example: Pre-Solution Stage

| Quantities Produced (QP): number of cars produced by a factory in a given week =Production Days (PD) x Production Rate (PR) | | | | |
|---|---|---|---|---|
| | Week | | | Factory |
| | 1 | 2 | 3 | |
| Quantities Produced (QP) | PD11xPR1 | PD21xPR1 | PD31xPR1 | 1 |
| | PD12xPR1 | PD22xPR1 | PD32xPR1 | 2 |
| | PD13xPR1 | PD23xPR1 | PD33xPR1 | 3 |
| Total Qantities Produced ($\sum$QP) in all factories | $\sum$PD1x | $\sum$PD2x | $\sum$PD3x | |

FIGURE 9B

Example: Pre-Solution Stage

Available (A): Cars available for delivery in a given week = Total Quantity Produced (TQP) + Inventory (I)

Delivered (D): Cars delivered in a given week;

Not Delivered (ND): Cars not delivered in a given week = Demand (DM) – Delivered (D)

Inventory (I): Inventory at the end of a week = Inventory at beginning of Week (I) + Available (AV) – Delivered (D)

|  | Week | | | | Total |
|---|---|---|---|---|---|
|  | 0 | 1 | 2 | 3 |  |
| Available |  | $\sum QP1+I1$ | $\sum QP2+I2$ | $\sum QP3+I3$ |  |
| Delivered (D) [decision variable] |  | D1 | D2 | D3 |  |
| Not Delivered (ND) [constraint] |  | DM1-D1 | DM2-D2 | DM3-D3 | $\sum ND$ |
| Inventory (I) [constraint] | 5 | I0+AV1-D1 | I1+AV2-D2 | I2+AV3-A3 | I3 |
| Grand Total: Total Not Delivered ($\sum ND$) + Inventory (I3) [objective] | | | | | $\sum ND+I$ |

FIGURE 9C

Example: Linear Solution Stage

| Production Days (PD): number of days that a factory can produce in a given week | | | | |
|---|---|---|---|---|
| | Week | | | Factory |
| | 1 | 2 | 3 | |
| Production days [decision variable] | 0.5 | 3 | 6 | 1 |
| | 0 | 0 | 0 | 2 |
| | 0 | 0 | 7 | 3 |
| Total Production Days (TPD) in all factories | 0.5 | 3 | 13 | |

| Unused Days: number of days a factory is not used in a given week = Resource Availability (RA) - Production Days (PD) | | | | |
|---|---|---|---|---|
| | Week | | | Factory |
| | 1 | 2 | 3 | |
| Unused days (UD) [constraint] | 4.5 | 4 | 0 | 1 |
| | 2 | 1 | 5 | 2 |
| | 4 | 3 | 0 | 3 |

| Sum of squares of unused days (objective) |
|---|
| 91.25 |

FIGURE 10A

Example:Linear Solution Stage

| | Week | | | Factory |
|---|---|---|---|---|
| | 1 | 2 | 3 | |
| Quantities Produced (QP) | 5 | 30 | 60 | 1 |
| | 0 | 0 | 0 | 2 |
| | 0 | 0 | 70 | 3 |
| Total Quantities Produced ($\sum QP$) in all factories | 5 | 30 | 130 | |

Quantities produced: number of cars produced by a factory in a given week =Production Days (PD) x Production Rate (PR)

FIGURE 10B

Example: Linear Solution Stage

Available (A): Cars available for delivery in a given week = Total Quantity Produced (TQP)+ Inventory (I)

Delivered (D): Cars delivered in a given week;

Not Delivered (ND): Cars not delivered in a given week = Demand (DM) – Delivered (D)

Inventory (I): Inventory at the end of a week = Inventory at beginning of Week (I) +Available (AV) – Delivered (DV)

|  | Week | | | | Total |
|---|---|---|---|---|---|
|  | 0 | 1 | 2 | 3 |  |
| Available |  | 10 | 30 | 150 |  |
| Delivered (D) [decision variable] |  | 10 | 10 | 150 |  |
| Not Delivered (ND) [constraint] |  | 0 | 0 | 0 | 0 |
| Inventory (I) (constraint) | 5 | 0 | 20 | 0 | 0 |
| Grand Total: Total not delivered ($\sum$ND) + Inventory (I3) [objective] |  |  |  |  | 0 |

FIGURE 10C

Example: Quadratic Solution Stage

| Production Days (PD): number of days that a factory can produce in a given week | | | | |
|---|---|---|---|---|
| | Week | | | Factory |
| | 1 | 2 | 3 | |
| Production days (PD) [decision variable] | 2.1 | 4.1 | 3.1 | 1 |
| | 1.1 | 0.1 | 4.1 | 2 |
| | 1.1 | 0 | 7 | 3 |
| Total Production Days (TPD) in all factories | 4.4 | 4.4 | 11.4 | |

| Unused Days: number of days a factory is not used in a given week= Resource Availability (RA) - Production Days (PD) | | | | |
|---|---|---|---|---|
| | Week | | | Factory |
| | 1 | 2 | 3 | |
| Unused days (UD) [constraint] | 2.9 | 2.9 | 2.9 | 1 |
| | 0.9 | 0.9 | 0.9 | 2 |
| | 2.9 | 2.9 | 2.9 | 3 |

| Sum of squares of unused days (objective) |
|---|
| 51.1 |

FIGURE 11A

Example: Quadratic Solution Stage

| Quantities produced: number of cars produced by a factory in a given week = Production Days (PD) x Production Rate (PR) | | | | |
|---|---|---|---|---|
| | Week | | | Factory |
| | 1 | 2 | 3 | |
| Quantities Produced (QP) | 21.5 | 41.5 | 31.5 | 1 |
| | 3.4 | 0.4 | 12.4 | 2 |
| | 11.5 | 1.5 | 41.5 | 3 |
| Total Quantities Produced ($\sum$QP) in all factories | 36.3 | 43.3 | 85.3 | |

FIGURE 11B

Example: Quadratic Solution Stage

Available (A): Cars available for delivery in a given week = Total Quantity Produced (TQP)+ Inventory (I)

Delivered (D): Cars delivered in a given week;

Not Delivered (ND): Cars not delivered in a given week = Demand (DM) − Delivered (D)

Inventory (I): Inventory at the end of a week = Inventory at beginning of Week (I) +Available (AV) − Delivered (DV)

|  | Week | | | | Total |
|---|---|---|---|---|---|
|  | 0 | 1 | 2 | 3 |  |
| Available |  | 41.3 | 74.6 | 150 |  |
| Delivered (D) [decision variable] |  | 10 | 10 | 150 |  |
| Not Delivered (ND) [constraint] |  | 0 | 0 | 0 | 0 |
| Inventory (I) (constraint) | 5 | 31.3 | 64.6 | 0 | 0 |
| Grand Total: Total not delivered (∑ND) − Inventory (I3) [objective] |  |  |  |  | 0 |

FIGURE 11C

Example: Linear and Quadratic Stages

| Production Days (PD): Linear Solution Stage | | | | |
|---|---|---|---|---|
| | Week | | | Factory |
| | 1 | 2 | 3 | |
| Production days (decision variable) | 0.5 | 3 | 6 | 1 |
| | 0 | 0 | 0 | 2 |
| | 0 | 0 | 7 | 3 |
| Total Production Days (TPD) in all factories | 0.5 | 3 | 13 | |

| Production Days (PD): Example: Quadratic Solution Stage | | | | |
|---|---|---|---|---|
| | Week | | | Factory |
| | 1 | 2 | 3 | |
| Production days (decision variable) | 2.1 | 4.1 | 3.1 | 1 |
| | 1.1 | 0.1 | 4.1 | 2 |
| | 1.1 | 0 | 7 | 3 |
| Total Production Days (TPD) in all factories | 4.4 | 4.4 | 11.4 | |

FIGURE 12

MIXING OPTIMAL SOLUTIONS

FIELD OF THE INVENTION

This invention relates to a method and apparatus for mixing optimal solutions. In particular this relates to a method and apparatus for mixing optimal solutions in order to quickly find a pragmatic optimal solution.

BACKGROUND

Linear programming (LP) and mixed integer programming (MIP) are well known technologies for building optimization applications. An optimization problem is approximated with linear equations (LP) sometimes with integer valued decision variables (MIP). Then the model (set of equations is solved by LP or MIP engine like IBM Ilog CPLEX), which outputs an optimal solution (or near optimal solution in the MIP case), with regard to an objective. IBM, CPLEX and Ilog are trademarks of International Business Machines in the US and/or other countries.

Optimization engines (for instance LP and MIP engines) can provide a solution that has an undesired characteristic even if it is mathematically optimal. Furthermore, a solution proposed by a solving engine is arbitrarily chosen by the engine among all possible ones. Generally a solution is chosen based on algorithmic criteria, or mathematical criteria, unrelated to the semantics of the problem being solved. Moreover, in the LP case, and in lesser measure in the MIP case, a solution is generally extreme (mathematically a vertex in mathematical search space), meaning that LP/MIP algorithms favor solutions using a very small subset of decision variables. Some variables are "artificially unused" if their value is zero, but having a positive value would not degrade the solution quality mathematically they are "in base, but null").

The prior art addresses the problem of mixing known solutions, but no approach tries to find a solution in the middle of a feasible or optimal space to allow calculate compromise solutions instead of extreme ones.

One simple solution consists in exploring all extreme solutions S1, S2, . . . , Sn, and finding the sum of weighted solutions divided by the weight.

This simple solution has a disadvantage that it includes all of the extreme solutions in the averaging. All these solutions needs to be calculated explicitly which is very time/CPU consuming An extreme solution is also known as a vertex or base solution. Furthermore it takes some time to compute them because of the potentially large number of the extreme solutions.

Another solution using Pareto optimality also uses all of the solution S1, S2, . . . , Sn. This solution uses an explicit (known) list of relevant individual solutions to balance and calculates the solution is a smarter way. This can save some calculation time but requires that a list of the relevant individual solution is already known.

US patent publication 2010/0287073 A1 is titled 'Method for optimizing a transformation scheme' discloses including multiple objectives but does not disclose mixing a plurality of optimal solutions.

US patent publication 2009/0271230 A1 is titled 'Method and system for solving stochastic linear programs with the condition value at risk constraints'. This stochastic MIP method iteratively searches for optimality with respect to risk constraints, but does not mix optimal solutions.

US patent publication 2011/0131167 A1 is titled 'Linear programming relaxation modification and cut selection in a MIP solution' uses LP relaxation and cutting planes for pruning the search space, but does not mix optimal solutions.

U.S. patent application Ser. No. 7,346,528 B2 is titled 'Integrated decision support system for optimizing the training and transition of airline pilots'. The adaptive, dynamic, integrated, and automated optimizer system comprises parameters of a mixed integer programming model that are altered to provide multiple alternative solutions of said mixed integer programming model. This model proposes multiple solutions, but each solution is the optimal solution of a different MIP models (not a unique model), by model parameters alteration. Moreover, those various solutions are not mixed; they are only exposed to the user as is.

US patent publication 2011/0202638-A1 is titled 'Mixed integer programming model for minimizing leased access network costs'. This discloses an application of regular MIP algorithm to find one (only) solution a MIP problem. The originality is in the model, not the solving approach. The post optimization step does not do mixing solution either.

US patent publication 2002/0156663-A1 is entitled 'Shipping and transportation optimization system and method'. Here the MIP model is solved by successive LPs, followed by local search. The successive solutions in both cases are not optimal (and moreover are not mixed), and the algorithm stops at first solution satisfying the halting criterion.

US patent publication 2005/0265359-A1 is titled 'Optimizing switch port assignments'. This is a quadratic MIP model solved by two methods: 1) classical QP w/a branch and bound, 2) an IP approximation of the quadratic term. There are no optimal solutions mixing in this publication.

A solution is needed that avoids explicit calculation of all the extreme solutions and thus avoids unrealistic exploration in this search space.

A solution is needed that requires less processing time.

A solution is needed that does not require external knowledge of the extremes solutions.

SUMMARY OF INVENTION

In a first aspect of the invention there is provided a method for selecting an optimised solution in a computerised multiple constraint problem space, comprising: receiving a linear function for optimization; receiving a set of constraints for the linear function; determining a first optimal solution for the linear function and initial constraints using linear programming solver;

creating a new set of constraints using the first optimal solution in addition to the initial constraints; creating a new quadratic function by adding a quadratic objective of slack variables to the linear function; and determining a solution to the quadratic function and new constraints using a quadratic programming solver.

This solution replaces standard LP/MIP extreme solutions, with a general purpose compromise solution. The solution ignores individual optimal solutions to find equilibrium, but instead uses the distance to constraints in order to find a solution 'in the middle' of the optimal space. The state of the art addresses the problem of mixing known solutions, but no approach tries to find a solution 'in the middle' of optimal space to allow calculate compromise solutions instead of extreme ones.

The solution offers realistic algorithmic complexity as there is no need to calculate all individual extreme solutions before finding an equilibrium among them. Plain quadratic programming can be used which has a polynomial complexity where the objective is positive definite.

The proposed method and systems is generic and can be a feature of a general purpose LP/MIP solver or as a specialist LP solver in controller for controlling a device.

It can also be easily customized by allowing a developer, administrator or user to input an arbitrary set of weighted coefficients for each constraint.

The solution is still optimal for the original problem. The equilibrium objective does not guarantee Pareto optimality. It guarantees some equilibrium with regard to constraint, not with regard to extreme (vertices) solutions. A compromise solution to any optimization problem is more robust than extreme ones because being in the middle of the optimal space minimizes the change of radical solution shifts due to changes in constraints. Output compromise solutions can be tested against the proposed quadratic cost.

The quadratic function is a quadratic distance of the wished solution to the constraints (the so-called "slack" variables). This distance is based on the slack variable in inequality constraints of the problem.

Preferably the slack variable constraints have a default set of weights. The slack variables are weighted, then squared and finally added in order to obtain the objective of the second phase of the optimization process. Input cost of slack variable is an indicator for identifying invention. Alternatively, the slack variable constraints are based on said one or more administrator or user-determined cost coefficients. It is weighted by user-given costs of the constraint slacks that combines all distances in a unique and homogeneous unit of measure (the same unit of measure used previously in the objective function). The distance is made semantically meaningful by using user-given coefficients that evaluate the cost of the proximity to constraints, thus having a homogeneous distance metrics in term of unit of measure.

Advantageously the linear function can be an integer function.

According to a second aspect of the invention there is provided a method for selecting one or more optimised values in a computerised multiple-constraint problem space, comprising: receiving as inputs a first set of input values of a mixed integer programming component, a second set of input values of a linear programming component, and a cost-weighted set of squared slack variable constraints based on one or more user-determined cost coefficients; producing a first set of output values of said mixed integer programming component; producing a second set of output values of said linear programming component; creating a restricted solution space according to said first set of output values and said second set of output values; and selecting an optimised value from said restricted solution space by applying a further restriction based on said cost-weighted set of squared slack variable constraints based on said one or more user-determined cost coefficients.

In a third aspect of the invention there is provided a system for selecting an optimized solution in a computerized multiple-constraint problem space.

In a fourth aspect of the invention there is provided a computer program product for selecting an optimized solution in a computerized multiple-constraint problem space.

DESCRIPTION OF DRAWINGS

Embodiments of the invention will now be described, by means of example only, with reference to the accompanying drawings in which:

FIG. 4A to 4F are code diagrams of a linear programming method;

FIG. 5 is a table of production rate constraints for a production planning example solved by this invention;

FIG. 6 is a table of resource availability constraints for the example;

FIG. 7 is a table of the demand constraints for the example;

FIG. 9A is a table diagram showing production days, unused days and sum of squares of unused days for a pre-solution stage of the example;

FIG. 9B is a table showing quantities produced for a pre-solution stage of the example;

FIG. 9C is a table diagram showing numbers available; numbers delivered; numbers not delivered; inventory and a grand total for a pre-solution stage of the example;

FIG. 10A is a table diagram showing production days, unused days and sum of squares of unused days for a linear solution stage of the example;

FIG. 10B is a table showing quantities produced for a linear solution stage of the example;

FIG. 10C is a table diagram showing numbers available; numbers delivered; numbers not delivered; inventory and a grand total for a linear solution stage of the example;

FIG. 11A is a table diagram showing production days, unused days and sum of squares of unused days for a quadratic solution stage of the example;

FIG. 11B is a table diagram showing quantities produced for a quadratic solution stage of the example;

FIG. 11C is a table diagram showing numbers available; numbers delivered; numbers not delivered; inventory and a grand total for a quadratic solution stage of the example; and FIG. 12 is a table diagram comparing the production days tables from the linear and quadratic programming stages.

DESCRIPTION OF THE EMBODIMENTS

Figure 1:
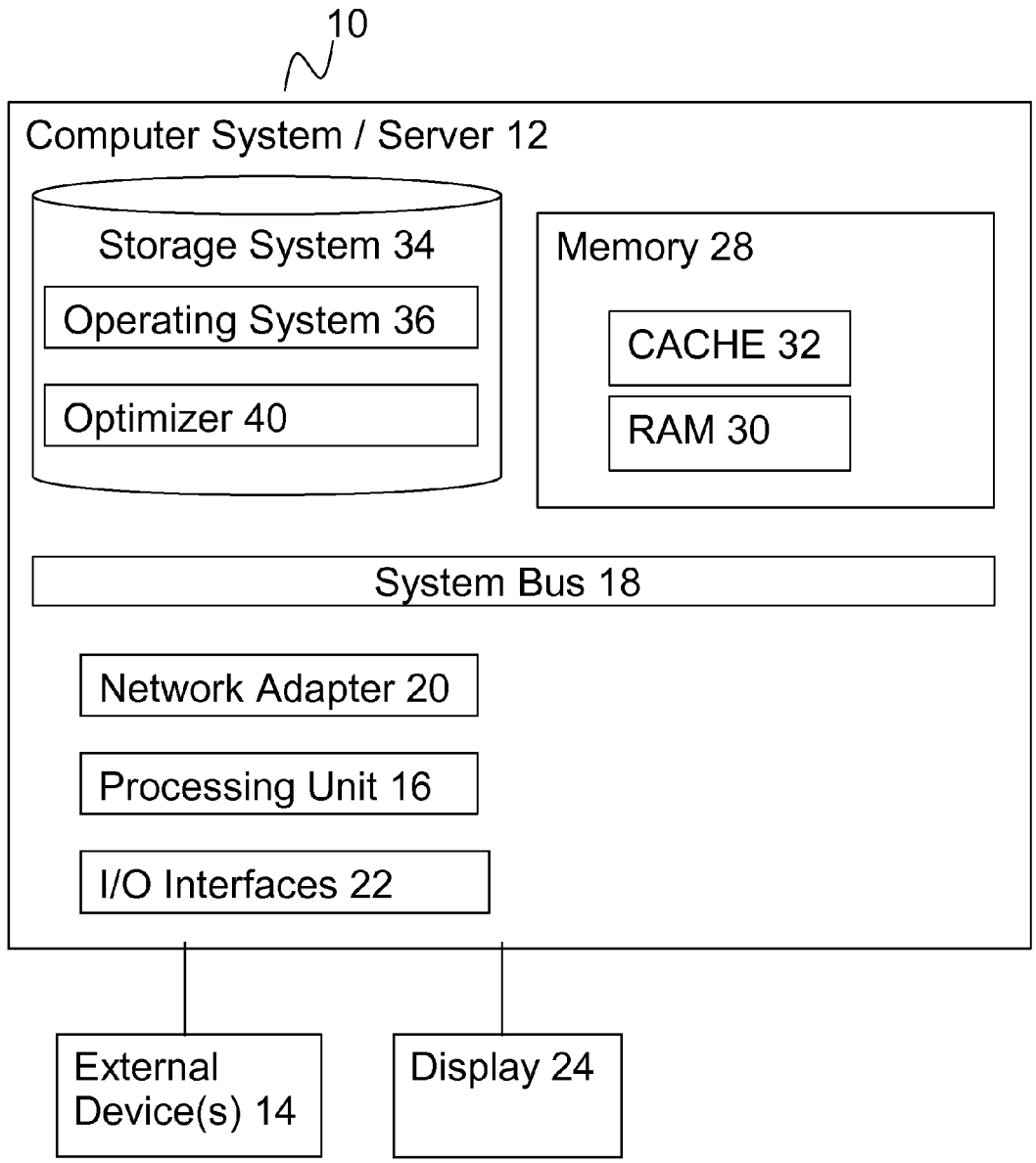
FIG. 1 is a deployment diagram of a conventional optimizer in a computer system.

Referring to FIG. 1, there is shown a component diagram of a computer system node 10 according to the prior art. Computer system node 10 comprises a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, mini-computer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be embodied in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in computer system node 10 is shown in the form of a general-purpose computing device. The components of computer system/server 12 may include, but are not limited to, one or more processors or processing units 16, system memory 28, and bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (for instance a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product (for example, operating system 36 and optimizer 40) that are configured to carry out the functions of embodiments of the invention.

Optimizer 40, may be stored in memory 28 by way of example, and not limitation, as well as operating system 36. Each of the program modules, may include an implementation of a networking environment. Program modules generally carry out the functions and/or methodologies of embodiments of the invention as described herein.

Computer system/server 12 may also communicate with one or more external devices 14 such as a keyboard, a pointing device, a display 24; one or more devices that enable a user to interact with computer system/server 12; and/or any devices (network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems.

Figure 2:
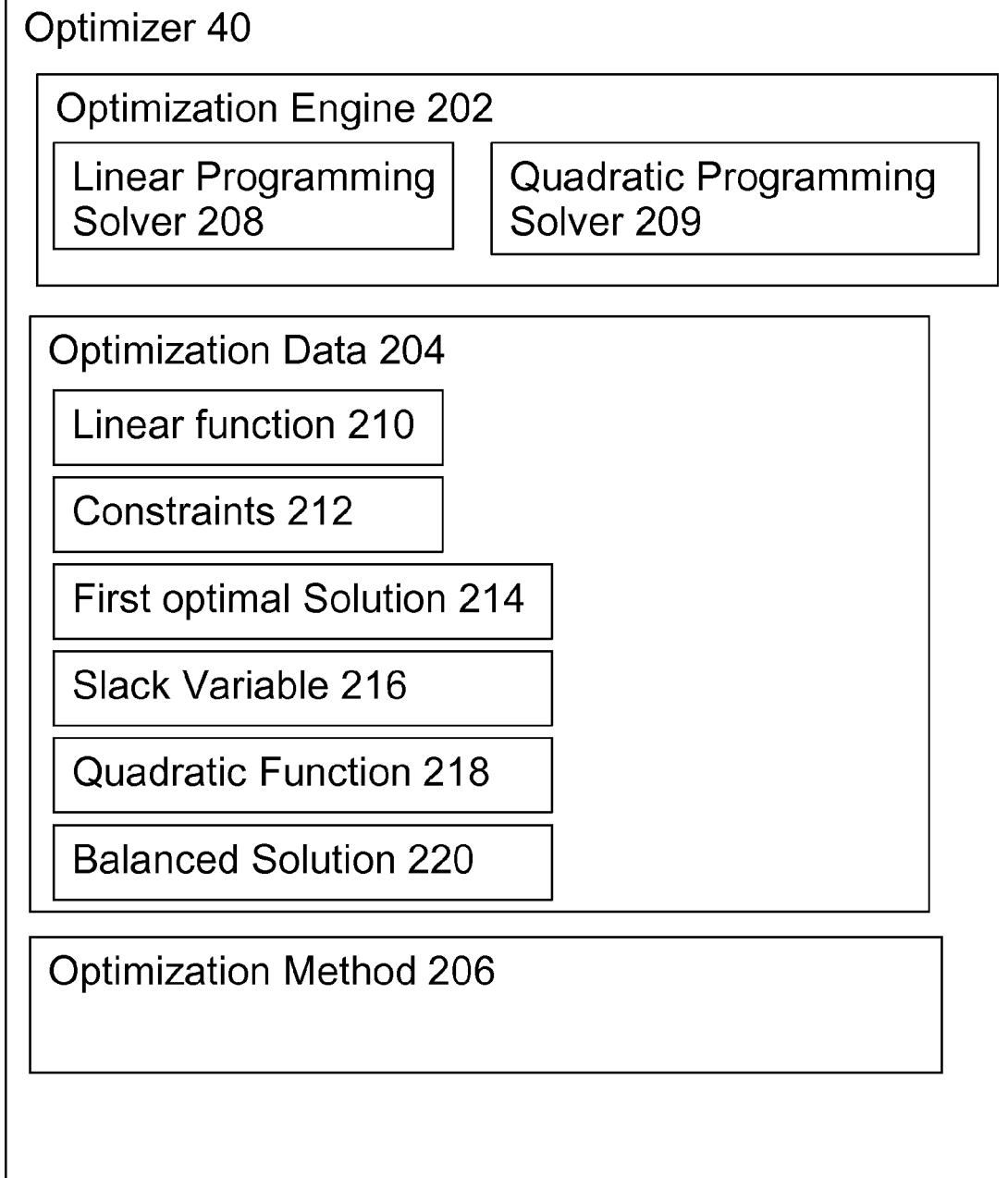
FIG. 2 is a component diagram of the optimizer according to an embodiment.

Optimizer 40 according to an embodiment shown in FIG. 2 comprises optimization engine 202; optimization data 204 and optimization method 206.

Optimization engine 202 is based on a linear programming engine supplied with IBM Ilog Cplex Optimizer version 12 and comprises linear programming solver 208 and quadratic programming solver 209. IBM ILOG CPLEX provides flexible, high-performance mathematical programming solvers for linear programming, mixed integer programming, quadratic programming, and quadratic constrained programming problems. However, any linear programming engine or mixed integer programming engine can be used. The example tables were built using Microsoft Excel 2003 Solver add-in linear programming solver component. Microsoft and Excel are trademarks of Microsoft Corporation in the US and/or other countries.

Linear programming solver 208 is well known and is for solving linear problems of the type $AX+Y=B$ to optimize $CX$ with certain constraints of $X$.

Quadratic programming solver 209 is well known and is for solving quadratic problems of the type $(DX)^2+CX=B$ to optimize with certain constraints of $X$.

Optimization data 204 comprises: linear function 210; constraints 212; first optimal solution 214; slack variables 216; quadratic function 218; and balanced solution 220.

Linear function 210 is a mathematical programming function stored in memory of the type $AX+Y=B$ where A and B are constants and X and Y are the variables that require solving. In the code example linear function is represented by the letters 'mps'.

Constraints 212 are limitations on what the value of X and Y can be. In the code example, the constraints are represented by a matrix M.

Optimal solutions 214 are solutions that are calculated by the linear programming solver 208 as optimized. In an embodiment only one optimal solution is stored.

Slack variables 216 store variables that are added to an inequality constraint to transform it to an equality. Introducing a slack variable replaces an inequality constraint with an equality constraint and a non-negativity constraint.

Quadratic function 218 is a mathematical programming function stored in the memory of the type $DX^2+AX+Y=B$ where A, B and D are constants and X and Y are variables to be solved.

Balanced solution 220 is a solution that is solved by quadratic programming solver 209.

Figure 3:
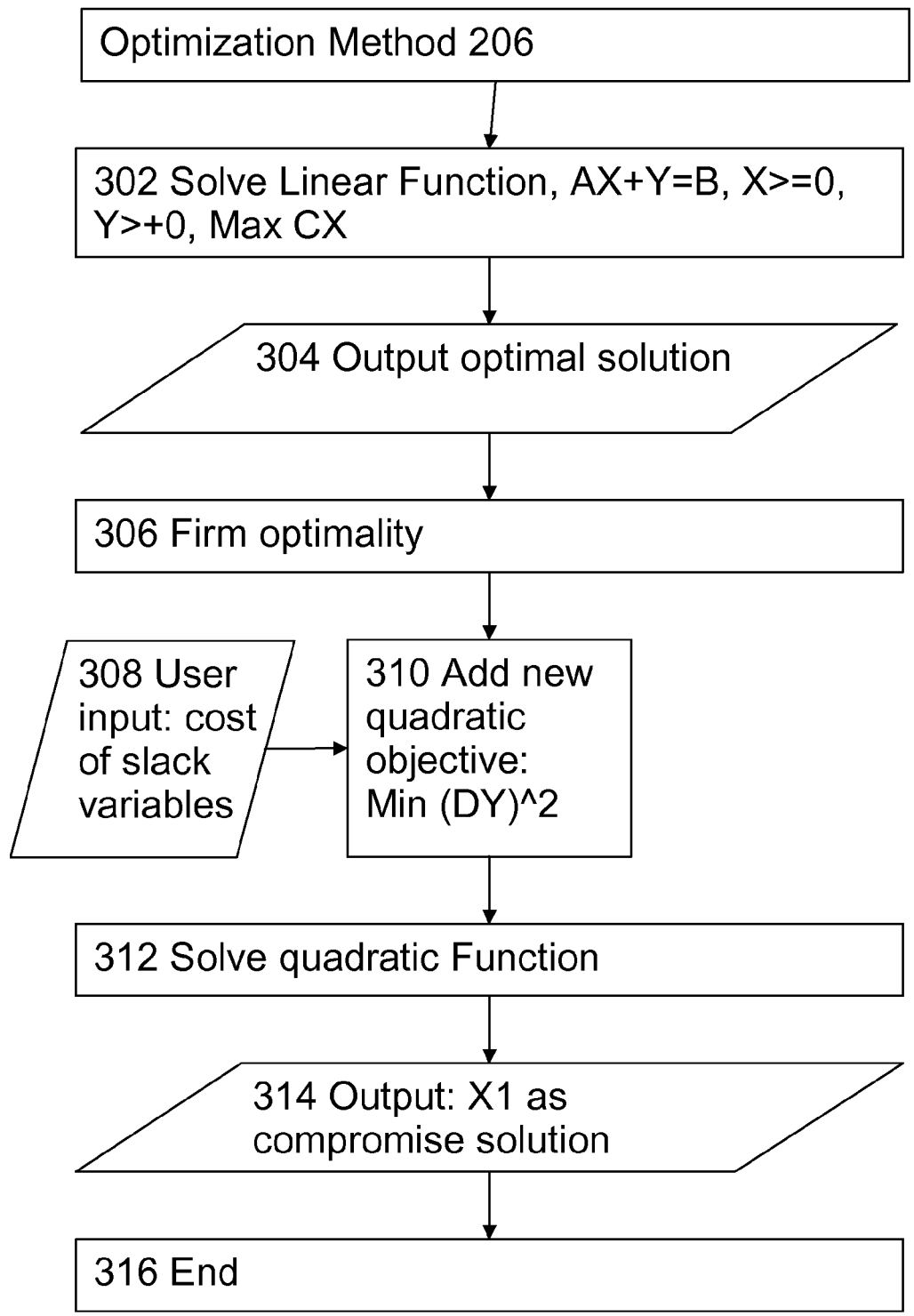
FIG. 3 is a flow diagram of an optimization method of an embodiment.

Optimization method 206 of an embodiment of the present invention comprises logical process steps 302 to 316 as shown in FIG. 3.

Step 302 is for solving the linear function 210 given the constraints 212.

Step 304 is for making an first optimal solution 214 available.

Step 306 is for adding the optimal solution 214 as a constraint for a new function 218.

Step 308 is for adding slack variable constraints as constraints for the new function 218.

Step 310 is for adding a quadratic objective to the linear function 210 to create quadratic function 218.

Step 312 is for solving the quadratic function given the old and new constraints.

Step 314 is for providing a solution X1 for the quadratic problem that is the comprise solution for the linear problem.

Step 316 is the end of the method.

FIG. 4A to 4F are code diagrams of a linear programming stage of the method where the code has lines 1 to 50. Code identified with a particular step in the optimization method may be called out below and described with further comments after a '///' delimiter. Other code not called out is relevant for the embodiment. '//' represents comments in the code diagram that are not necessarily the same as corresponding comments in the description.

The code in FIG. 4A represents step 302 of the optimization method.

Line 1 read mps matrix M // where read is an instruction to the linear solver to acquire the linear problem mps and the constraints M.

Line 3 solve the MIP problem using MIP /// is the instruction for the linear solver called MIP (one of the IBM ILOG CPLEX problem solving engines) to solve the problem The code in FIG. 4B represents step 304 of the optimization method.

Line 4 double O1=optimal value /// sets a variable to be the optimal value output of the solver.

The code in FIG. 4C represents step 306 of the optimization method.

Line 5 get objective Obj from M;

Line 6 get epsilon from parameters;

Line 7 add constraints O1 -epsilon<=Obj<=O1+epsilon; /// instructs new constraints to include the solution O1 (the optimal value)

The code in FIG. 4D represents the formulation of the new constraints by adding of the slack variables to step 308 of the optimization method. Inequalites, lower bound variables and upper bound variables are treated differently.

The code in FIG. 4E, lines 39 to 44, represents the solving of the quadratic equation in step 310 of the optimization method.

Line 44 minimize q, under constraints in M; /// instructs the quadratic problem solver (QP-solver) to solve the problem by minimizing q under the constraints of the new constraints in matrix M.

The code in FIG. 4F, lines 45 to 50, represents the output of the solution 'v' in step 312 of the optimization method.

FIG. 5 is a table of production rate constraints for a production planning example solved by this invention. In the production planning example, the product rate (PR) is the number of cars produced per day by a given factory. There are three factories: Factory 1, Factory 2 and Factory 3 and there are three corresponding production rates: PR1; PR2; and PR3. In the example Factory 2 lags the other factories by some margin in its production rate.

FIG. 6 is a table of resource availability constraints for the example. Resource Availability (RA) is the number of days each factory is available in a particular week. There are three weeks: Week 1; Week 2 and Week 3. Resource availability is represented in the table but could also be represented as a matrix:

FIG. 7 is a table of the Demand (DD) constraints for the example. Demand is the number of cars required in a given week. There are three different demands DD1=10; DD2=10; DD=150. Week 3 has the largest demand by an order of magnitude.

Figure 8:
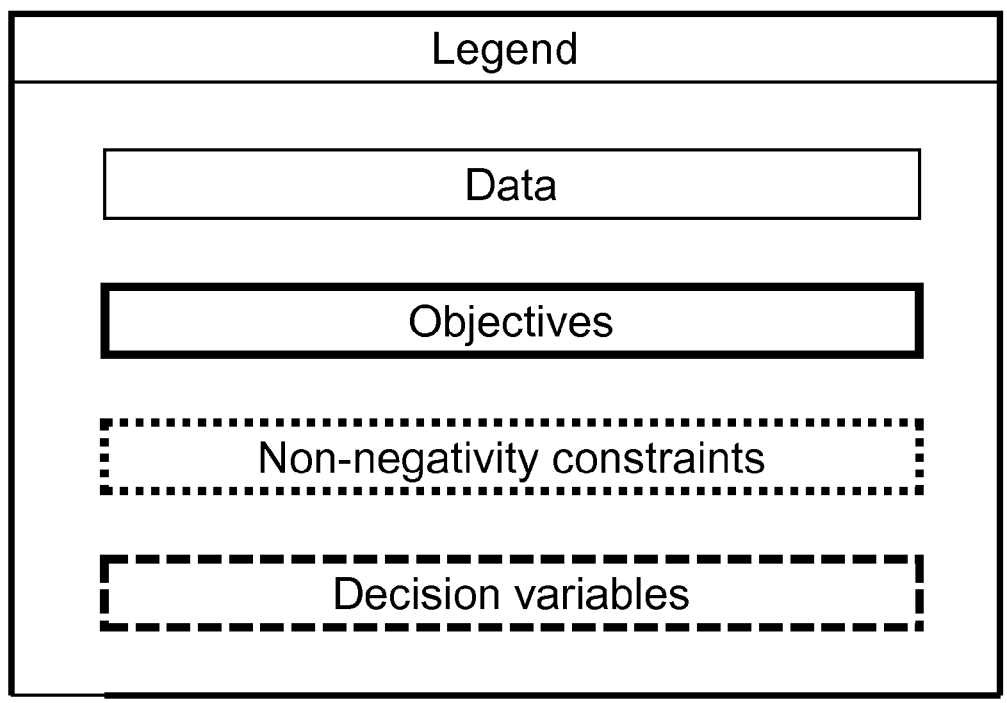
FIG. 8 is a table showing the legend for certain types of data shown in the example.

FIG. 8 is a table showing the legend for certain types of data shown in the example. All data is represented by normal solids lines but some data is worth emphasizing. Objectives are that part of the function that is being optimized are highlighted by a thick solid line. One objective is defined as minimizing the total of the inventory and the items not delivery. Another objective is minimizing the sum of the squares of the unused days.

Non-negativity constraints are non-negative constraints and are highlighted by a thick dotted line around the values of concern. In FIG. 9A, 10A, 11A, unused days are highlighted as a non-negativity constraint. In FIG. 9C, 10C and 11C, the number of cars not delivered is marked as a non-negativity constraint and the inventory (I) at the end of the week is highlighted as a non-negativity constraint.

Decision variables are highlighted by a thick dashed line around the values of concern. In FIG. 9A, 10A, 11A the production days are marked and highlighted as decision variables. In FIG. 9C, 10C and 11C, the number of cars delivered in a week is highlighted and marked as decision variables.

FIG. 9A is a table diagram showing production days, unused days and sum of squares of unused days for a pre-solution stage of the example.

Production Days (PD) are the number of days that a factory can produce in a given week. This is a decision variable and therefore before the solution starts it is an empty variable or matrix labelled only by the variables that represent the given production day for a given week and factory: PD11; PD21; PD311; PD12; PD22; PD32; PD13; PD23; PD33. Total Production Days for a given week is represented by $\Sigma PD1x$; $\Sigma PD2x$; and $\Sigma PD3x$.

Unused Days (UD) are the number of days a given factory is not used in a given week and is calculated by taking respective Resource Availability (RA) away from Production Days (PD). By defining UD such that it will never be negative it becomes a non-negativity constraint. Before the solution starts there are no values for Productivity Days and therefore no values for the Unused Days which used Productivity Days.

The sum of squares of the unused days is the quadratic variable that is the object of the quadratic problem. Since production days is unknown before solving the equation then Sum of squares of the unused days are also unknown.

FIG. 9B is a table showing quantities produced for a pre-solution stage of the example.

Quantities Produced (QP) is the number of cars produced by a factory in a given week found by the product of Production Days (PD) and Production Rate (PR). It is dependent on a decision variable and therefore unknown until solved.

FIG. 9C is a table diagram showing numbers Available; numbers Delivered (D); numbers Not Delivered (ND); inventory (I) and a grand total for a pre-solution stage of the example.

Number Available (A) is the number of cars available for delivery in a given week and is defined by the Total Quantity Produced (TQP)+ Inventory (I) in a given week.

Number of Delivered (D) is the number of cars delivered in a given week. This is a decision variable.

Number of Not Delivered (ND) is the number of cars not delivered in a given week and is defined as Demand (DM) minus Delivered (D). ND is non-negativity constraint.

Number in Inventory (I) is the Inventory (I) at the end of a week and is defined as the Inventory at beginning of Week (I)+Available (AV)−Delivered (D). I is a non-negativity constraint.

The grand total at the end of the weeks is the total Not Delivered (ND) plus the inventory at the end of the weeks. Minimizing the total not delivered and the inventory is set as an objective along with minimizing the sum of the squares of the unused days.

FIG. 10A is a table diagram showing production days, unused days and sum of squares of unused days for a linear solution stage of the example. The solution shown is the linear solution where only the total not delivered was minimized at zero (see FIG. 10C). It can be seen that the production days are very busy in the last week for the most efficient factories and this is considered as an optimal solution but not a very balanced one. As consequence of production days being heavy in week 3, it can be see that the there are many more unused days in Week 1 and 2 and in Factory 2 in the Unused Days table. Furthermore, although not used in the linear solution, it can be see that the sum of squares of unused days will be high is there are more unused days. As will be seen 91.25 is a high number compared with what is possible for example in FIG. 11A.

What would happen if there was a problem at a factory in the last week? Ideally a more balanced solution would be chosen and that is the new objective shown in FIG. 11A, 11B and 11C.

FIG. 10B is a table showing quantities produced for a linear solution stage of the example. These numbers reflect the frantic effort in production in Week 3 at Factory 1 and 3.

FIG. 10C is a table diagram showing numbers available; numbers delivered; numbers not delivered; inventory and a grand total for a linear solution stage of the example. Shows that the original objective to keep the total not delivered and inventory to a minimum was achieved by having most deliveries (150 cars) in Week 3.

FIG. 11A is a table diagram showing production days, unused days and sum of squares of unused days for a quadratic solution stage of the example. In this example, the unused days are have been used to set a new quadratic objective to be solved, the quadratic solver now seeks to minimize the sum of the squares of the unused days as well as the total not delivered. The Production Days can be seen to be more evenly distributed across weeks and factories and even Factory 2 is put to work.

FIG. 11B is a table diagram showing quantities produced for a quadratic solution stage of the example. This can be seen to more evenly distributed across the weeks.

FIG. 11C is a table diagram showing numbers available; numbers delivered; numbers not delivered; inventory and a grand total for a quadratic solution stage of the example. It can be seen that the solution has been constrained to keep total not delivered plus inventory at a minimum as before but this time has built up the available cars for delivery.

FIG. 12 is a table diagram comparing the production days tables from the linear and quadratic programming stages where a more even distribution can be seen.

Further embodiments of the invention are now described.

It will be clear to one of ordinary skill in the art that all or part of the method of the present invention may suitably and usefully be embodied in additional logic apparatus or additional logic apparatuses, comprising logic elements arranged to perform the steps of the method and that such logic elements may comprise additional hardware components, firmware components or a combination thereof.

It will be equally clear to one of skill in the art that some or all of the functional components of the present invention may suitably be embodied in alternative logic apparatus or apparatuses comprising logic elements to perform equivalent functionality using equivalent method steps, and that such logic elements may comprise components such as logic gates in, for example a programmable logic array or application-specific integrated circuit. Such logic elements may further be embodied in enabling elements for temporarily or permanently establishing logic structures in such an array or circuit using, for example, a virtual hardware descriptor language, which may be stored and transmitted using fixed or transmittable carrier media.

It will be appreciated that the method and arrangement described above may also suitably be carried out fully or partially in software running on one or more processors (not shown in the figures), and that the software may be provided in the form of one or more computer program elements carried on any suitable data-carrier (also not shown in the figures) such as a magnetic or optical disk or the like. Channels for the transmission of data may likewise comprise storage media of all descriptions as well as signal-carrying media, such as wired or wireless signal-carrying media.

The present invention may further suitably be embodied as a computer program product for use with a computer system. Such an implementation may comprise a series of computer-readable instructions either fixed on a tangible medium, such as a computer readable medium, for example, diskette, CD-ROM, ROM, or hard disk, or transmittable to a computer system, using a modem or other interface device, over either a tangible medium, including but not limited to optical or analogue communications lines, or intangibly using wireless techniques, including but not limited to microwave, infra-red or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infra-red, or microwave. It is contemplated that such a computer program product may be distributed as a removable medium with accompanying printed or electronic documentation, for example, shrink-wrapped software, pre-loaded with a computer system, for example, on a system ROM or fixed disk, or distributed from a server or electronic bulletin board over a network, for example, the Internet or World Wide Web.

In an alternative, the present invention may be realized in the form of a computer implemented method of deploying a service comprising steps of deploying computer program code operable to, when deployed into a computer infrastructure and executed thereon, cause the computer system to perform all the steps of the method.

In a further alternative, the present invention may be realized in the form of a data carrier having functional data thereon, the functional data comprising functional computer data structures to, when loaded into a computer system and operated upon thereby, enable the computer system to perform all the steps of the method.

It will be clear to one skilled in the art that many improvements and modifications can be made to the foregoing exemplary embodiment without departing from the scope of the present invention.

The invention claimed is:

1. A method for selecting an optimized solution in a computerized multiple-constraint problem space, comprising:
   receiving, by a processor, a linear function for optimization;
   receiving, by the processor, a set of constraints for the linear function;
   determining, by the processor, a first optimal solution for the linear function and initial constraints using a linear programming solver;
   creating, by the processor, a new set of constrains using the first optimal solution as a constraint in addition to the initial constraints;
   creating, by the processor, a new quadratic function by adding a quadratic objective of slack variables to the linear function; and determining, by the processor, a solution to the quadratic function and new constraints using a quadratic programming solver.

2. A method according to claim 1 wherein the slack variable constraints have a default set of weights.

3. A method according to claim 2 wherein the slack variable constraints are based on one or more administrator or user determined cost coefficients.

4. A method according to claim 1 wherein the linear function can be an integer function.

5. A method of controlling a device using a method as according to claim 1.

6. A method for selecting one or more optimized values in a computerized multiple-constraint problem space, comprising:
- receiving, by a processor, as inputs a first set of input values of a mixed integer programming component, a second set of input values of a linear programming component, and a cost-weighted set of squared slack variable constraints based on one or more user-determined cost coefficients;
- producing, by the processor, a first set of output values of said mixed integer programming component;
- producing, by the processor, a second set of output values of said linear programming component;
- creating, by the processor, a restricted solution space according to said first set of output values and said second set of output values; and
- selecting, by the processor, an optimized value from said restricted solution space by applying a further restriction based on said cost-weighted set of squared slack variable constraints based on said one or more user-determined cost coefficients.

7. A system comprising a processor configured to perform a method for selecting an optimized solution in a computerized multiple-constraint problem space, comprising, the method comprising:
- receiving, by the processor, a linear function for optimization;
  - receiving, by the processor, a set of constraints for the linear function;
- determining, by the processor, a first optimal solution for the linear function and initial constraints using the linear programming solver;
- creating, by the processor, a new set of constrains using the first optimal solution as a constraint in addition to the initial constraints;
- creating, by the processor, a new quadratic function by adding a quadratic objective of slack variables to the linear function; and
- determining, by the processor, a solution to the quadratic function and new constraints using the quadratic programming solver.

8. A system according to claim 7 wherein the slack variable constraints have a default set of weights.

9. A system according to claim 8 wherein the slack variable constraints are based on said one or more administrator or user determined cost coefficients.

10. A system according to claim 7 wherein the linear function can be an integer function.

11. A computer program product comprising computer readable recording medium having computer readable code stored thereon for selecting an optimized solution in a computerized multiple-constraint problem space, said computer readable code which when loaded onto a computer system and executed performs the following steps:
- receiving a linear function for optimization;
  - receiving a set of constraints for the linear function;
- determining a first optimal solution for the linear function and initial constraints using a linear programming solver;
- creating a new set of constrains using the first optimal solution as a constraint in addition to the initial constraints;
- creating a new quadratic function by adding a quadratic objective of slack variables to the linear function; and
- determining a solution to the quadratic function and new constraints using a quadratic programming solver.

12. A computer program product according to claim 11 wherein the slack variable constraints have a default set of weights.

13. A computer program product according to claim 12 wherein the slack variable constraints are based on one or more administrator or user determined cost coefficients.

* * * * *